United States Patent

Hitomi et al.

[11] 4,162,869
[45] Jul. 31, 1979

[54] UNMANNED CONVEYING CONTROL SYSTEM

[75] Inventors: Shinichi Hitomi, Hiratsuka; Tetsuya Nakayama, Fujisawa; Tetsuji Funabashi, Hiratsuka, all of Japan

[73] Assignee: Kabushiki Kaisha Komatsu Seisakusho, Tokyo, Japan

[21] Appl. No.: 820,995

[22] Filed: Aug. 1, 1977

[30] Foreign Application Priority Data

Aug. 6, 1976 [JP] Japan .................. 51-93786
Aug. 6, 1976 [JP] Japan .................. 51-93789
Aug. 6, 1976 [JP] Japan .................. 51-93792

[51] Int. Cl.² .................................................. B65G 67/00
[52] U.S. Cl. .................................... 414/70; 180/168; 280/131; 414/117; 414/134
[58] Field of Search ............... 104/88; 214/8.5 R, 11, 214/16.4 A, 6 F, 6 G, 6 P; 246/30, 63 R; 180/98, 131

[56] References Cited
U.S. PATENT DOCUMENTS

| | | | |
|---|---|---|---|
| 3,411,603 | 11/1968 | Kohls | 180/98 |
| 3,667,564 | 6/1972 | Schnell | 180/98 |
| 3,719,287 | 3/1973 | Billingsley et al. | 214/16.4 A |
| 3,768,586 | 10/1973 | Thompson et al. | 180/98 |
| 3,790,006 | 2/1974 | Hartman | 214/16.4 A |
| 3,968,888 | 7/1976 | Van Vliet | 214/16.4 A |
| 4,015,536 | 4/1977 | Sato | 180/98 |
| 4,026,654 | 5/1977 | Beaurain | 180/98 |
| 4,040,527 | 8/1977 | Krieg | 214/16.4 A |

FOREIGN PATENT DOCUMENTS

1904377 10/1973 Fed. Rep. of Germany ............. 180/98

*Primary Examiner*—Lawrence J. Oresky
*Attorney, Agent, or Firm*—Ladas, Parry, Von Gehr, Goldsmith & Deschamps

[57] ABSTRACT

An unmanned conveying control system capable of conveying a load between a base position such as a gateway of a warehouse or a predetermined position in a manufacture line in a factory and a storage place in the warehouse or factory as well as loading and unloading of the load in such base position and storage place completely automatically and without an operator. A load conveying way is defined by leader cables along which an unmanned travelling vehicle is guided. Leader cables are provided along load storage lines (lanes) in the warehouse or factory and a central control unit gives out load storage and load delivery instructions and applies a guide signal only to a lane in which the vehicle should be guided. The vehicle detects the state of the load placed in front of the vehicle and transfers the load from the vehicle to a required layer of a stacked load when the vehicle has received the load storage instruction, or from a required layer to the vehicle when it has received the load delivery instruction. The loading and unloading operations of the vehicle and forward and reverse movements and stopping of the vehicle required for such loading and unloading operations are all performed automatically.

6 Claims, 22 Drawing Figures

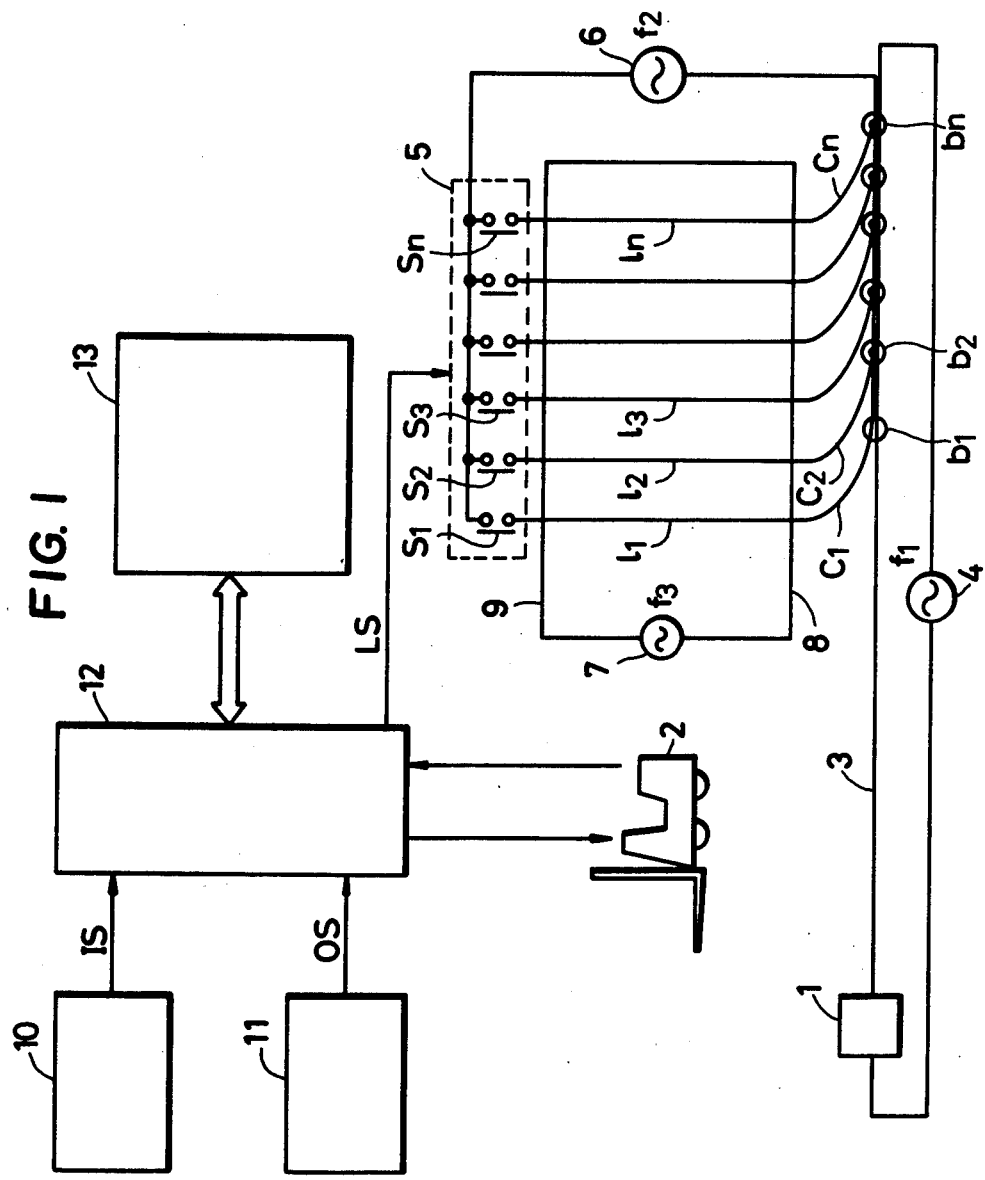

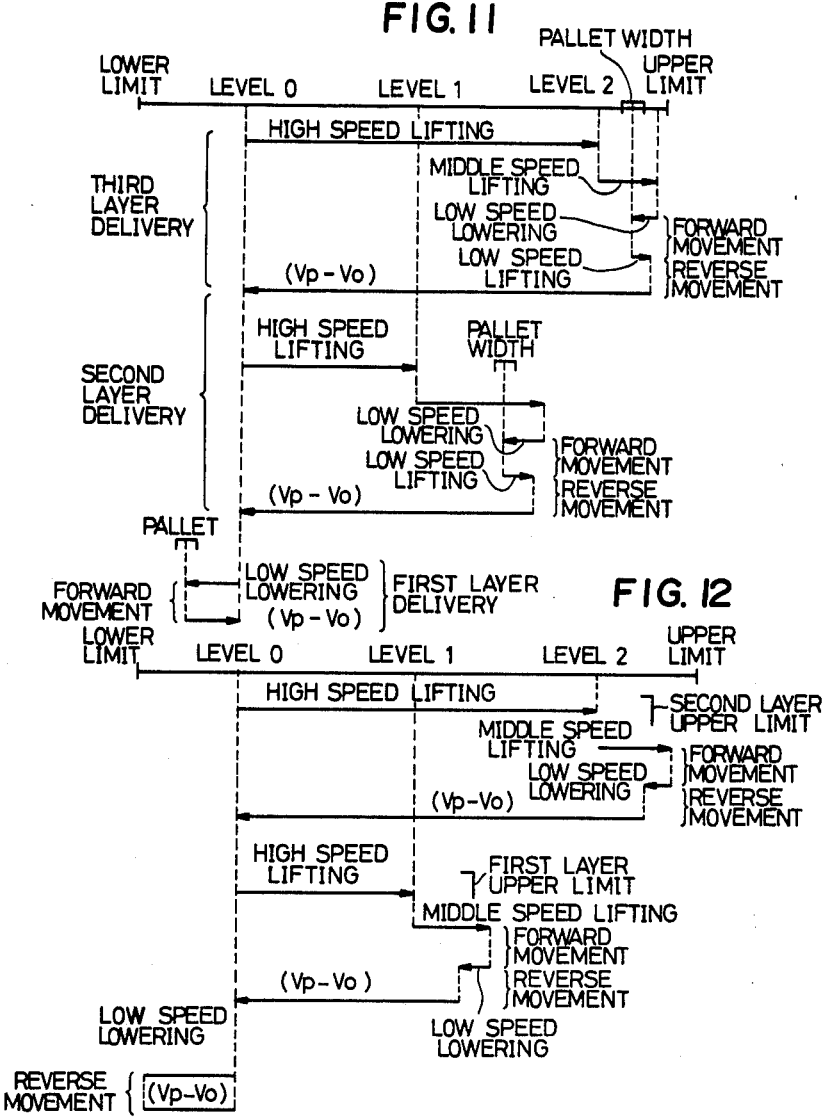

UNMANNED CONVEYING CONTROL SYSTEM

BACKGROUND OF THE INVENTION

This invention relates to an unmanned conveying control system useful in a work area such as a warehouse or a factory.

Unmanned conveying system using a conveyor belt or a stacker crane have been known for conveying a desired load between a work area such as a warehouse or a factory and a predetermined position (e.g. a gateway of a warehouse or a certain position on a manufacture line of a factory). The prior art system using the conveyor conveys a load on a fixed conveyer line and loads or unloads the load at a predetermined position by means of a loading and unloading machine. In the prior art system using a stacker crane, racks are provided in a storage place in a warehouse or a factory and loading and unloading operations are made by a stacker crane which is displaceable along the racks. These prior art systems, however, are large scale systems in which change of the conveyor line cannot be readily made once it has been established. Besides, the conveyor lines of these prior art systems occupy a large space so that space cannot be utilized efficiently for storage of goods.

There has also been used an absolute position control system in which a ground equipment is provided for enabling a loading and unloading vehicle to detect the position of a rack or a loading table so as to inform the vehicle of a loading and unloading place. This system has the disadvantage that a large ground equipment and a large amount of provision work are required if there are many loading and unloading positions resulting in increase in the cost.

Further, in the prior art systems, a position instruction device is provided for determining a loading and unloading position and a control signal is applied to this device from outside for guiding the vehicle to a predetermined lane and shelf of rack, and this requires extremely complicated device and control.

SUMMARY OF THE INVENTION

It is, therefore, an object of the present invention to provide an unmanned conveying control system in which a series of load conveying work including loading and unloading and carrying of load along a certain path is conducted completely automatically.

It is another object of the invention to provide an unmanned conveying control system in which a vehicle adapted to run along a leader cable is employed to effect sequential loading and unloading along a predetermined section of the leader cable. Loading and unloading positions are automatically determined by detecting presence or absence of a load by means of sensors mounted on the vehicle and thereby controlling travel of the vehicle. Forward and reverse movements and stopping of the vehicle which are necessary for loading and unloading are sequence controlled and, moreover, a layer of a load to be stored or to be taken out is determined by detecting a state of storage of the load in each layer by means of the sensors mounted on the vehicle so as to enable the load to be automatically loaded on or unloaded from the determined layer by controlling lifting or lowering of a fork of the vehicle and forward and reverse movements of the vehicle.

It is another object of the invention to provide an unmanned conveying control system in which leader cables are provided along load storing lines to constitute lanes and the load is loaded and unloaded only in a predetermined section of each lane.

It is another object of the invention to provide an unmanned conveying control system capable of selecting one of the lanes by supplying a low frequency signal only through a leader cable in the lane in which the load is to be loaded or unloaded.

It is another object of the invention to provide an unmanned conveying control system in which lifting and lowering speed of the fork are variably controlled in the loading and unloading operation for increased efficiency.

It is still another object of the invention to provide an unmanned conveying control system capable of automatically detecting an opening in a pallet in which the fork should be inserted in loading and unloading of the load forming a plurality of layers and stopping the fork in front of the detected opening.

According to the invention, the load is stacked directly on the leader cable and presence or absence of the load placed in front of the vehicle running on the leader cable is detected by a sensor mounted on the vehicle and loading and unloading operations are conducted in accordance with a result of detection. Accordingly, the loading and unloading operations can be performed without providing a station which shows a loading and unloading position. Further, the system according to the invention can utilize space for storage of the load very efficiently because no predetermined loading place is designated and the load is stored without using a rack. According to this system, a plurality of leader cable are provided in parallel, with a part of each leader cable being designated as the lane for loading and unloading the load. The portion which constitutes the lane is defined by providing station cables through which a low frequency signal flows such that these station cables interset at right angles with the lane (leader cable) at starting and finishing ends of the lane. The vehicle is mounted with pick-up coils for detecting the magnetic field generated by the leader cables and with station detection pick-up coils for detecting the magnetic field generated by the station cables intersecting the leader cables. The starting and finishing ends of the lane are detected on the basis of an electromotive force generated in the station detection pick-up coil. If, for example, the load is to be stored in an empty lane, a loaded vehicle is caused to run along the lane and, upon detection of the finishing end of the lane by the station detection pick-up coil, start unloading of the load from the vehicle from this position. If the vehicle detects presence of the load before detecting the starting end of the lane, it means that the lane is fully loaded.

The system according to the invention comprises a memory for memorizing the operation of the vehicle and a central command device for identifying the kind of the load to be stored and delivered out and designating a conveying process or a next lane for loading or unloading the load on the basis of the stored data of the memory device. Conveying and stock management of the load can be conducted thoroughly automatically.

BRIEF DESCRIPTION OF THE DRAWINGS

FIG. 1 is a block diagram showing an embodiment of the unmanned conveying control system according to the invention;

FIG. 11 is a diagram showing modes of control by the delivery control circuit shown in FIG. 9;

FIG. 12 is a diagram showing modes of control by the storage control circuit shown in FIG. 10;

DESCRIPTION OF A PREFERRED EMBODIMENT

Figure 2A:
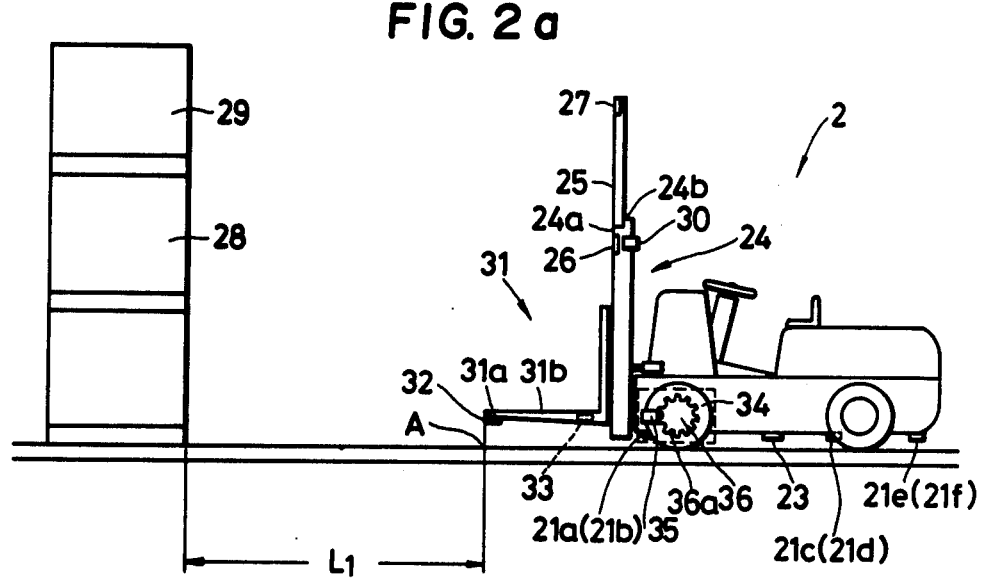
FIGS. 2(a) and 2(b) are side and bottom views of an example of an umnammed travelling vehicle employed in the system according to the invention.

In the embodiment to be described hereinbelow, a conventional fork lift truck mounted with control and detection devices necessary for unmanned travelling and unmanned loading and unloading operations is employed as the unmanned travelling vehicle. Such a vehicle is convenient because it can be operated both manually and without an operator and also is advantageous because it can be realized simply by mounting a relatively simple control device on a conventional fork lift truck.

In the present embodiments, space in which the unmanned travelling vehicle can work is within a warehouse and a predetermined base position which constitutes a point of connection with an outside system is located at a gateway of the warehouse.

Referring first to FIG. 1, an outline of the preferred embodiment of the unmanned conveying control system according to the invention will be described.

A storage and delivery table 1 which consists, e.g., of a roller conveyor and constitutes a predetermined base position is provided at a gateway of a warehouse in which load to be stored or delivered out is loaded on and unloaded from an unmanned fork lift truck 2.

A main leader cable 3 along which the unmanned fork lift truck 2 is guided extends in the middle of a central runway from the storage and delivery table 1. A low frequency current with a frequency $f_1$ generated by an oscillator 4 flows through the leader cable 3.

Lane leader cables $C_1$ through $C_n$ are branched from the main leader cable 3 at branch points $b_1$ through $b_n$ and portions of the lane leader cables $C_1$ through $C_n$ form lanes $l_1$ through $l_n$ for storing the load.

A lane switching circuit 5 is provided for the lanes $l_1$ through $l_n$. The lane switching circuit 5 is provided for the lanes $l_1$ through $l_n$. The lane switching circuit 5 includes switches $S_1$ through $S_n$ corresponding to the lanes $l_1$ through $_n$ and the low frequency induced current of a frequency $f_2$ is caused to flow from an oscillator 6 through one of the lane leader cables $C_1$ through $C_n$ by closing one of the switches $S_1$ through $S_n$ thereby form a guideway for the fork lift truck in the particular lane.

Leader cables 8 and 9 through which a low frequency induced current of a freuency $f_3$ flows a provided in such a manner that they cross the lanes $l_1$ through $l_n$ perpendicularly at either end thereof. The leader cables 8 and 9 function to show starting and finishing ends of the respective lanes $l_1$ through $l_n$. The unmanned fork lift truck 2 detects the starting and finishing ends of the lanes $l_1$ through $l_n$ by detection on induced electromotive force from the leader cables 8 and 9.

The kind of load to be stored which is placed at the table 1 is detected by a stored load kind detector 10.

The stored load kind detector 10 can be constituted, e.g., of a known device according to which a coded kind of load is printed on the load and such kind of load is read in an optical manner.

A delivery card reader 11 is provided for reading kind of load to be delivered out of the warehouse from a delivery card (not shown). The delivery card reader 11 may be constituted, e.g., of a known device according to which a coded kind of load is punched in the delivery card and such coded kind of load is read in an optical or mechanical manner.

A signal is representing the kind of load to be stored which has been detected by the stored load kind detector 10 or a signal OS representing the kind of load to be delivered out which has been read by the delivery card reader 11 is applied to a central control unit 12.

In the central control unit 12, the signal IS or OS is applied to a stock memory device 13. The stock memory device 13 comprises a memory circuit which stores necessary data including kind of the stock stored in the warehouse, the number of the lane storing the load, amount of the stock and the data of storage. The number of a lane in which the load should be stored or from which the load should be delivered is read from the stock memory device 13 and, in response thereto, the central control unit 12 supplies a lane designation signal LS corresponding to the read out lane to the lane switching circuit 5 to close a switch corresponding to the lane and from a guide way to the lane. If, for example, the third lane $l_3$ is designated by the lane designation signal LS, a switch $S_3$ only is closed to cause the induced current to flow from the oscillator 6 through the leader cable $C_3$, whereby a guide way leading from the branch point $b_3$ to the lane $l_3$ consiting of the leader cable $C_3$ is formed.

The central control unit 12 supplies instructions for starting storage and delivery of the load, side-tracking and emergency stop etc. to the unmanned fork lift truck 2. This is effected by superposing frequency signals representing these instructions on the leader cables 3 and $C_1$ and through $C_n$. If a signal of a frequency corresponding to the storing of a load is designated by $f_a$ and a signal of a frequency corresponding to the delivering out of a load by $f_b$, the signal $f_a$ or $f_b$ is superimposed upon the signals $f_1$ and $f_2$. The pick-up coils 21a–21f mounted on the vehicle detect the signal $f_a$ or $f_b$ simultaneously with $f_1$ or $f_2$. The signal $f_a$ or $f_b$, when detected, is utilized for starting the sequence operation of storing or delivering out a load.

Operations for storing and delivering of the load will now be described.

When the load to be stored has arrived at the table 1, the kind of the load is detected by the stored load kind detector 10 and the lane in which the load should be stored is determined by confirming the amount of the stock and the state of storage of the load by the stock memory device 13. A signal representative of the number corresponding to this lane is fed to the lane switching circuit 5 for selecting the lane and, simultaneously, a storage start signal is applied to the fork lift truck 2. In response to this storage start signal, the fork lift truck 2 first performs loading of the load from the table 1 and thereafter travels reversely along the main leader cable 3 in accordance with the guide signal of the frequency $f_1$. As the fork lift truck 2 has detected the guide signal of the frequency $f_2$ of any one of the lane leader cables $C_1$ through $C_n$ at one of the branch points $b_1$ through $b_n$, the fork lift truck 2 is then guided by this guide signal of the frequency $f_2$ to run forwardly into the lane designated by the lane switching circuit 5. The fork lift truck 2 unloads the load on the designated lane in accordance with a predetermined sequence to be described later and thereafter returns to the table 1 through the branch point and the main leader cable, thereby completing one cycle of the load storage operation. The contents of the stock memory device 13 are rewritten in accordance with the kind of the stored load and the lane in which the load is stored.

Delivering out of the load from the warehouse is effected in the following manner.

When a delivery card on which the kind of the load to be delivered out of the warehouse has reached the delivery card reader 11, the kind of the load to be delivered out is read from this delivery card. The central control unit 12 searches for the stock of the required load and the lane in which the load is stored, determines a lane from which the required load should be delivered, and supplies a signal representing the number of this lane to the lane switching circuit 5 for closing the switch for the lane and simultaneously gives a delivery start instruction to the fork lift truck 2.

The fork lift truck 2 thereupon travels reversely from the table 1 along the main leader cable 3 in accordance with the signal of the frequency $f_1$ and runs into the lane designated by the lane switching circuit 5 from one of the branch points $b_1$ through $b_n$, guided by the signal of the frequency $f_2$ of the lane leader cable. In the designated lane, the fork lift truck 2 performs loading of the load in accordance with a predetermined sequence to be described later and then returns to the table 1 through the lane leader cable, the branch point and the main leader cable and unloads the load, whereby one cycle of the load delivery operation is completed. The contents of the stock memory device 13 are rewritten in accordance with the kind of the delivered out load and the lane in which the load was delivered out.

In the above described manner, the fork lift truck 2 conducts a sequence of operations in response to instructions given by the central control unit 12. For the operations of the fork lift truck 2 including running, loading and unloading sequences, the fork lift truck 2 is provided with various sensors and these sequences are performed in accordance with outputs of these sensors.

Figure 2B:
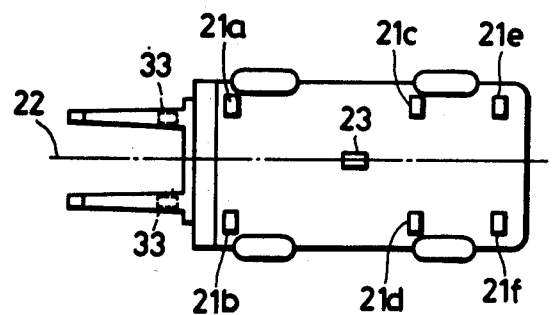

FIGS. 2(a) and 2(b) show an example of positions of sensors provided on the fork lift truck 2 employed in the present embodiment. Six running pick-up coils 21a, 21b, 21c, 21d, 21e and 21f are provided at the bottom of the fork lift truck 2 (FIG. 2(b)). The pick-up coils 21a and 21b, 21c and 21d, and 21e and 21f, which respectively form a pair, are disposed symmetrically on either side of a central axis 22 of the fork lift truck 2 in such a manner that axes of these coils intersect at right angles with the central axis 22. The pick-up coils 21c and 21d are provided in the vicinity of rear fixed wheels (rear wheels in the case of the fork lift truck). These pick-up coils 21a through 21f detect voltage induced by the leader cables (e.g. the main leader cable 3) through which the low frequency current flows. Deviation of the central axis 22 of the truck from the leader cable and the angle which the central axis 22 makes with the leader cable are detected from the induced voltage detected by the sensors 21a through 21f and the steering angle of the fork lift truck 2 is controlled in response to results of the detection for running the fork lift truck 2 along the leader cables. Among these six pick-up coils, the four pick-up coils 21a, 21b, 21c and 21d are used for a forward running whereas the four pick-up coils 21c, 21d, 21e and 21f are used for a reverse running. The pick-up coils 21a–21f can detect the other signal $f_a$ or $f_b$ which is superimposed on the signal $f_1$ or $f_2$. When the pick-up coils 21a–21f have ceased detecting the signals $f_1$ or $f_2$, the vehicle immediately stops even if the cessation of detection occurs during the sequence operation for storing or delivering out a load.

A station detection pick-up coil 23 is disposed in a position in which the axis of the coil extends in parallel with the central axis 22 of the truck 2. Accordingly, the coil 23 intersects at right angles with the station leader cables 8 and 9 indicating the starting and finishing ends of the lanes and detects the starting and finishing ends of the lanes by voltage induced from these station leader cables 8 and 9.

An upwardly extending post 25 is fixed to the upper portion of an outer mast 24a of a mast 24 mounted on the fork lift truck 2. A load sensor 26 used for detecting a load of a second layer is provided on the outer mast 24a and a load sensor 27 used for detecting a load on a third layer is provided on the post 25. These load sensors 26 and 27 are useful for detecting existence of the load on the second layer 28 and the third layer 29 if the load is stored in three layers as shown in FIG. 2(a).

A fork height detector 30 is provided at a suitable place on the outer mast 24a. The sensor 30 detects height of a fork 31 and outputs a signal corresponding to the detected height of the fork 31. This detector 30 is constituted, for example, of a rotary type potentiometer. The height of the fork 31 is detected by detecting displacement of inner mast 24b relative to the outer mast 24a during lifting or lowering of the fork 31 by means of a rack (not shown) mounted on the inner mast 24b and an associated pinion (not shown) mounted on the shaft of the potentiometer.

A sensor 32 is provided on the lower surface of a foremost end portion 31a of a claw 31b of the fork 31. This sensor 32 which consists, e.g. of a supersonic wave sensor detects a load or an obstacle in the front of the fork lift truck 2 and outputs a signal corresponding to the distance between the fork lift truck 2 and such load of the first layer or obstacle. Supersonic wave sensors suitable for the purpose are well known in the art and are of the type which measure distance to an object lying in front thereof by emitting supersonic waves towards the object, receiving the reflected emitted waves from the object and measuring the elapsed time between the emission and reception, the elapsed time being a measure of the distance.

A fork load sensor 33 is provided at a suitable place on the fork 31, e.g. a root portion of the claw 31a for detecting existence of the load on the fork 31. For this purpose, it will be appreciated that sensor 33 may be a conventional limit switch operated by the force exerted thereon by the load placed on the claw.

A running distance detector 35 is provided on a wheel 34 of the fork lift truck 2. The detector 35 detects teeth 36a for a gear 36 fixedly mounted on the wheel 34 and generates pulses of a number proportional to the running distance of the fork lift truck 2.

The sequence control of the unmanned vehicle conducted in response to the outputs of the above described sensors will now be described.

The unmanned fork lift truck 2 receives the storage start instruction or the delivery start instruction from the central control unit 12 and thereupon travels reversely from the gateway station 1 along the main leader cable 3 in accordance with the guide signal of the frequency $f_1$ while its steering is controlled by the induced voltages of the pick-up coils 21c, 21d, 21e and 21f.

When the fork lift truck 2 has reached a branch point of the main leader cable 3 and one of the lane leader cables $C_1$ through $C_n$ which is connected by operation of lane switching circuit 5 to an exciting power source 6 of the frequency $f_2$, the pick-up coils 21c through 21f detect the signal of the frequency $f_2$ besides the signal of the frequency $f_1$. The branch point is identified by detecting a predetermined level of the signal of the frequency $f_2$ and, upon detection of this branch point, a detection signal is supplied to a travel control device of the fork lift truck 2 to change the mode of running to the forward running. Simultaneously therewith, in the pick-up coils 21c, 21d, 21e and 21f detected frequency is changed from the frequency $f_1$ to the frequency $f_2$, so that the fork lift truck 2 is caused to travel along the selected lane leader cable in accordance with the guide signal of the frequency $f_2$. Thus, assuming that switch $S_2$ has been selected, signal $f_2$ flows through leader cable $C_2$ and signal $f_1$ flows through main leader cable 3. The vehicle, which has moved reversely along cable 3 (FIG. 1), detects signal $f_2$ besides $f_1$ at the point $b_2$. The vehicle is thereupon switched to forward movement and enters lane $1_2$, being guided by the signal of frequency $f_2$.

Since it takes some time for the fork lift truck 2 before it reaches a condition in which it can enter the lane leader cable in the forward running mode after detection of the branch point, a delay circuit or a circuit for detecting a running distance after detection of the branch point should preferably be provided so that switching of the running mode of the fork lift truck 2 to the forward running after detection of the branch point may be delayed.

The fork lift truck 2 which has travelled along the lane leader cable then performs an unloading or loading operation in the lane in accordance with the storage or delivery instruction which has previously been given to the truck 2.

Figure 3:
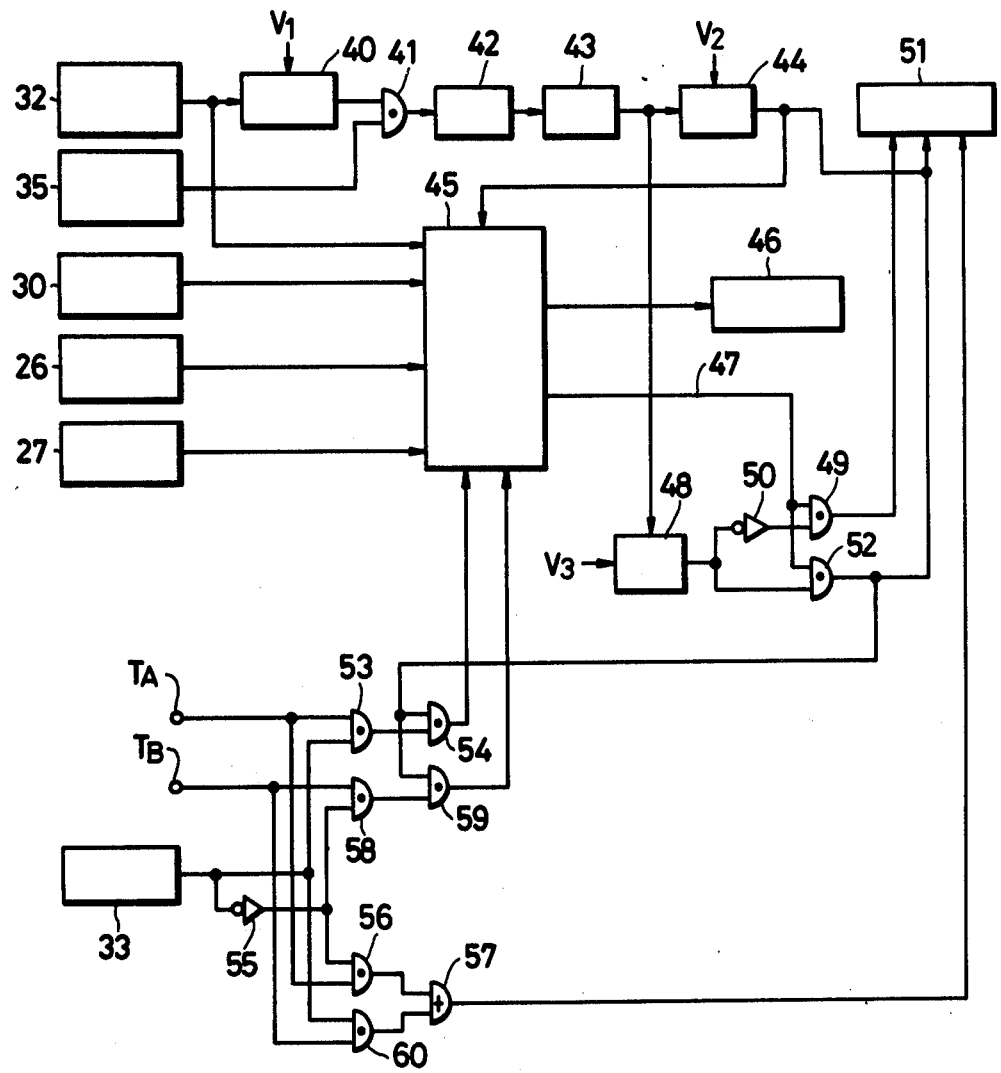
FIG. 3 is a block diagram showing an example of load storage and delivery control operations by the unmanned vehicle.

FIG. 3 shows controls in the loading and unloading operations of the fork lift truck 2.

Figure 5A:
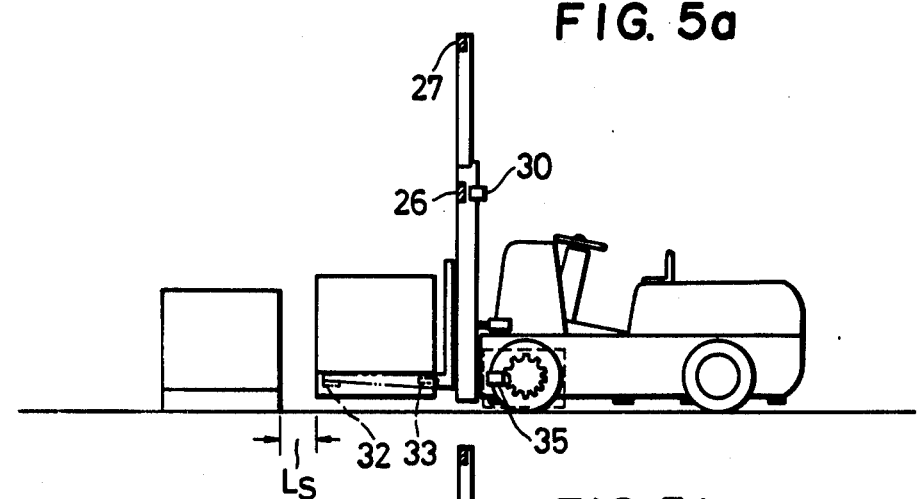
FIGS. 5(a), 5(b) and 5(c) are side views for explaining the load storage operation according to the control operation shown in FIG. 3.

First, control of unloading of the load from the fork 31 will be explained. Since the storage instruction has been issued, a signal "1" is applied to a terminal $T_1$. The fork load detector 33 outputs a signal "1" because the load is placed on the fork 31. If the sensor 32 provided at the foremost end portion 31a of the fork 31 has detected a load already stored ahead of the fork lift truck 2, the sensor 32 applies a voltage signal corresponding to the distance between this load and the foremost end portion 31a to a comparator 40. The comparator 40 to which a set voltage $V_1$ corresponding to a predetermined distance $L_1$ (a distance which can be accurately detected by means of a supersonic wave without influence of dispersion, e.g. 1 m) is also applied compares the voltage detected by the sensor 32 with the set voltage $V_1$ and, when the detection voltage of the sensor 32 has exceeded the set voltage $V_1$, applies a signal "1" to an AND gate 41. This enables the AND gate 41 to apply a pulse signal proportional to the running distance from the running distance detector 35 to a counter 42. This pulse is counted by the counter 42 and thereafter is converted to an analog signal by a digital-to-analog converter 43. The output of the digital-to-analog converter 43 which is a signal proportional to a running distance of the fork lift truck 2 from a point A (FIG. 2(a)) at which the distance between the load and the foremost end of the claw of the fork 31 is $L_1$ is applied to a comparator 44. The comparator 44 also receives a voltage $V_2$ corresponding to a predetermined distance $L_2$. When the output of the digital-to-analog converter 43 has reached $V_2$, that is, when the distance between the load and the foremost end of the claw has reached $L_1-L_2=LS$, the comparator 44 outputs a signal "1" which is applied to a running control device 51 for stopping the running of the fork lift truck 2 (see FIG. 5(a)). The signals representing existence or non-existence of the load on the first, second and third layers from the sensors 32, 26 and 27 are applied to a fork height control unit 45. The fork height control unit 45 determines a layer which the load should be unloaded in response to the signals from the sensors 32, 26, and 27.

Figure 4:
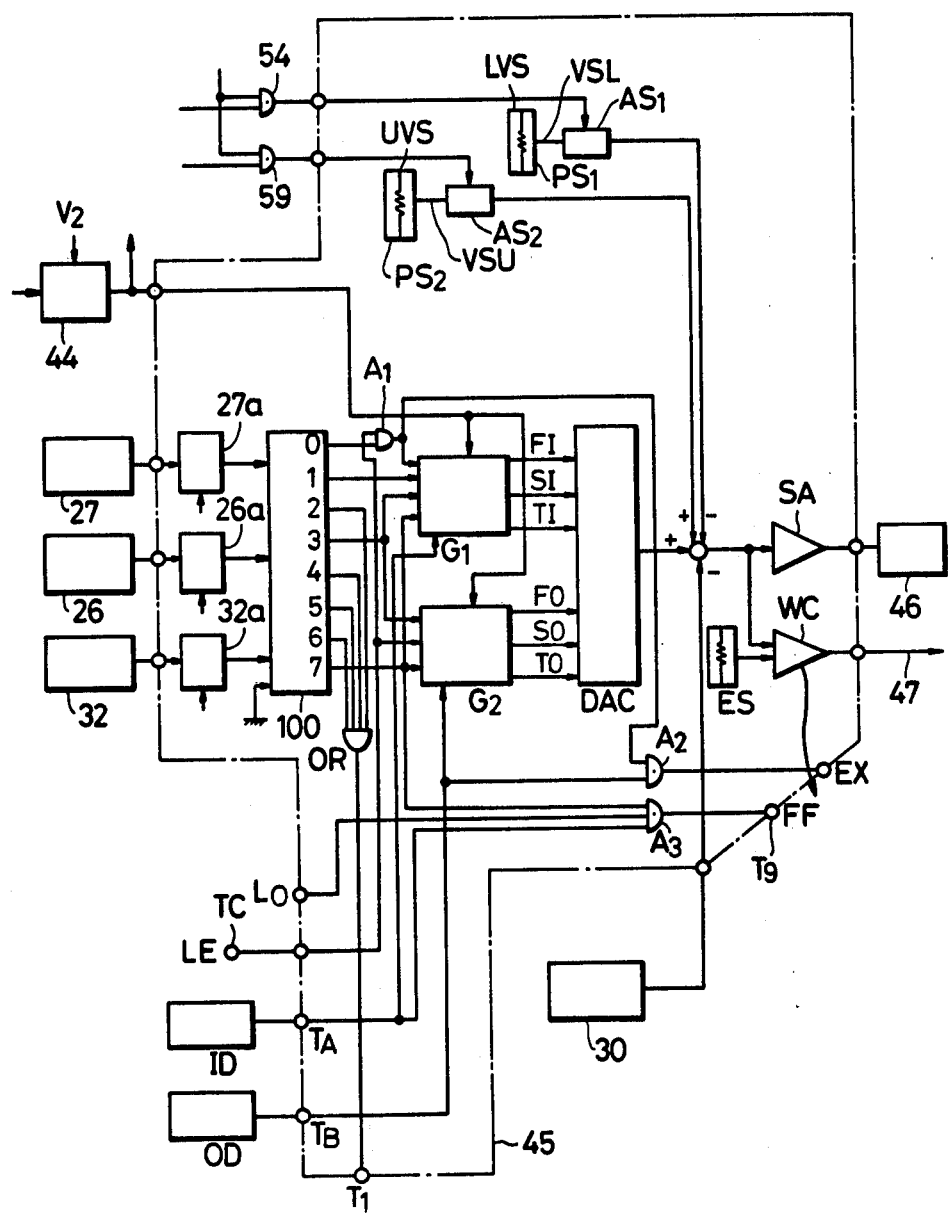
FIG. 4 is a block diagram showing a height control device 45 shown in FIG. 3 in detail.

FIG. 4 is an example of the circuit for determining the layer in which the load should be unloaded. The outputs of the sensors 27, 26 and 32 are respectively applied to comparison circuits 27a, 26a and 32a which compare them with voltages of predetermined levels. The comparison circuits 27a, 26a and 32a produce signal "1" or "0" which shows whether the load exists in the respective layers. These signals are applied to a decoder 100.

On the other hand, a storage designation signal ID is applied to a terminal $T_A$, a delivery designation signal OD to a terminal $T_B$ and a signal representing the finishing end of the lane to a terminal $T_C$. The operation of this circuit is summarized in the following Table 1. In this table, "0" signifies absence of a load and "1" presence of a load.

Table 1

| First layer | Second layer | Third layer | Layer available for storage | layer from which load should be delivered out |
|---|---|---|---|---|
| 0 | 0 | 0 | first layer (finishing end of the lane) | empty |
| 1 | 0 | 0 | second layer | first layer |
| 0 | 1 | 0 | | emergency stop |
| 1 | 1 | 0 | third layer | second layer |
| 0 | 0 | 1 | | emergency stop |

Table 1-continued

| First layer | Second layer | Third layer | Layer available for storage | layer from which load should be delivered out |
|---|---|---|---|---|
| 1 | 0 | 1 | emergency stop | |
| 0 | 1 | 1 | emergency stop | |
| 1 | 1 | 1 | first layer (or full) | third layer |

For achieving the operations shown in the table, an output "0" of a decoder 100 and a lane finishing end signal LE from the oscillator 7 are applied through an AND gate $A_1$ to a storage layer gate $G_1$. Outputs for values 1, 3 and 7 of the decoder 100 are applied to a delivery layer selection gate $G_1$ and a delivery layer selection gate $G_2$. Outputs for values 2, 4, 5 and 6 of the decoder 100 causes an emergency stop signal ES to be produced at the terminal $T_1$ via an OR gate OR. The storage designation signal ID is "1" when designating the storage operation, whereas it is "0" designating the delivery operation. The content of the delivery designation signal OD is reverse to the signal ID. The storage layer selection gate $G_1$ is enabled when the signal ID is "1" to produce output signals FL, SI and TI designating storage of load in the first through third layers in response to the output (either one of 0, 1, 3, 7) of the decoder 100.

Since the delivery designation signal OD is applied to the delivery layer selection gate $G_2$, the gate circuit $G_2$ is enabled when the signal OD is "1", producing output signals FO, SO, TO designating delivery of the load of the first through third layers in response to the output (either one of 1, 3, 7) of the decoder 100. The output of the AND gate $A_1$ and the signal OD are applied to an AND gate $A_2$ which produces an empty signal EX representing that the layer is empty when both inputs of the AND gate $A_2$ are "1". An AND gate $A_3$ receives the output for value 7 of the decoder 100, the storage designation signal ID and the lane starting end signal LO from the oscillator 7 and, when all inputs of the AND gate $A_3$ are "1", produces a full signal FF. The full signal FF is produced at a terminal $T_9$ when the fact that all of the layers are fully loaded at the starting end of the lane has been detected. In a case where the output for value 7 of the decoder 100 is produced at a position which is ahead of the starting end of the lane, this signifies that there is space available for storage in the front portion of the layer so that the load is stored in the first layer.

Figure 5B:
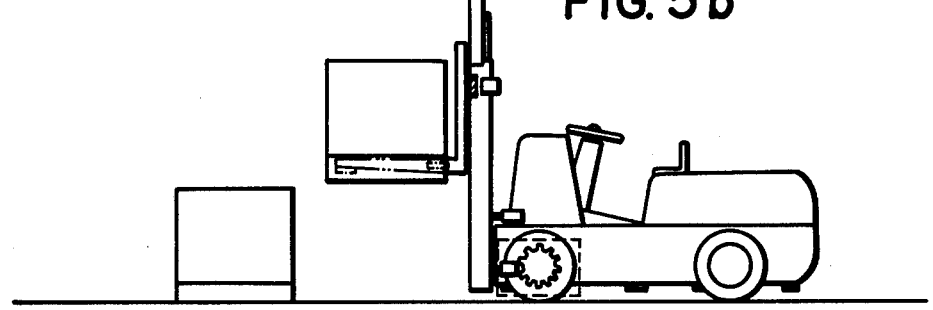
Figure 5C:
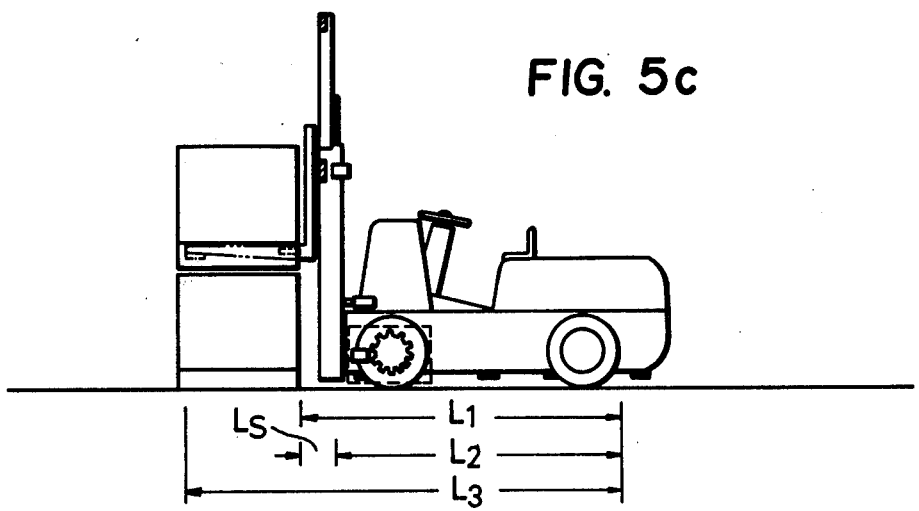

Upon determination of a layer available for storage of the laod in accordance with the outputs of the sensors 32, 26 and 27, an actuator 46 is operated by the signal from the comparator 44 to lift or lower the fork 31 to a height corresponding to the height of the layer available for storage which height has been determined on the basis of a value detected by the fork height detector 30. As shown in FIG. 5, in the case where the load is stored in the second layer, the second layer storage signal SI is produced by the gate circuit $G_1$. A difference between this signal SI and the output of the fork height detector 30 is obtained and this difference is converted to an analog value by a digital-to-analog converter DAC and threreafter is applied to the actuator 46 through a servo amplifier SA to operate the actuator 46 for lifting the fork. When the fork has reached a height corresponding to the second layer, the actuator 46 becomes inoperative and lifting of the fork is stopped. The height of the fork 31 at this time is determined at such a value that will reach the height of the pallet of the layer. When the lifting of the fork 31 has been completed, a forward movement start instruction is provided by a wind comparator WC on a line 47. This wind comparator WC produces an output when the above described difference comes within an output voltage of an error setter ES.

At this time, an output of a comparator 48 which compares the output of the digital-to-analog converter 43 with a set voltage $V_3$ corresponding to a distance $L_3$ is "0". Since an AND gate 49 receives the forward movement start instruction which is "1" and a signal "1" which is obtained by inverting the output of the comparator 48, the AND gate 49 is enabled to apply a signal "1" to a running control device 51 for forward movement of the fork lift truck 2.

As the output of the digital-to-analog converter 43 increases its value by the forward movement of the fork lift truck 2 and has reached the set voltage $V_3$ of the comparator 48, the output of the comparator 48 is turned to "1". This causes the output of the AND gate 49 to be turned to "0" and the output of an AND gate 52 to "1". The output "1" of the AND gate 52 is applied to the running control device to stop the truck 2 (See FIG. 5(c)).

Upon turning of the output of the AND gate 52 to "1", an AND gate 54 to which the storage instruction and the output of the fork load senser 33 are applied through an AND gate 53 is enabled to apply a signal "1" to an analog switch $AS_1$ as a fork lowering instruction. The analog switch $AS_1$ is therefore closed. Accordingly, a lowering amount signal VSL from a lowering amount setter LVS is applied to the servo amplifier SA which controls the actuator 46 for lowering of the fork 31 by a distance corresponding to the signal VSL.

As the output of the fork load sensor 33 is turned to "1" due to the lowering of the fork 31, the AND gates 53 and 54 are disenabled so that the fork lowering instruction is turned to "0". Simultaneously, an AND gate to which the storage instruction from the terminal $T_A$ and a signal obtained by inverting the output of the fork load sensor 33 are applied is enabled to apply a signal "1" to the running control device 51 through an OR gate 57 whereby the fork lift truck 2 moves reversely and the unloading operation of the fork lift truck 2 is completed.

Nextly, control of delivering out of the load will be explained.

During the delivery of the load, a delivery signal is applied to the terminal $T_B$ and the output of the load detector 33 is "0" for there is no load on the fork 31.

Figure 6A:
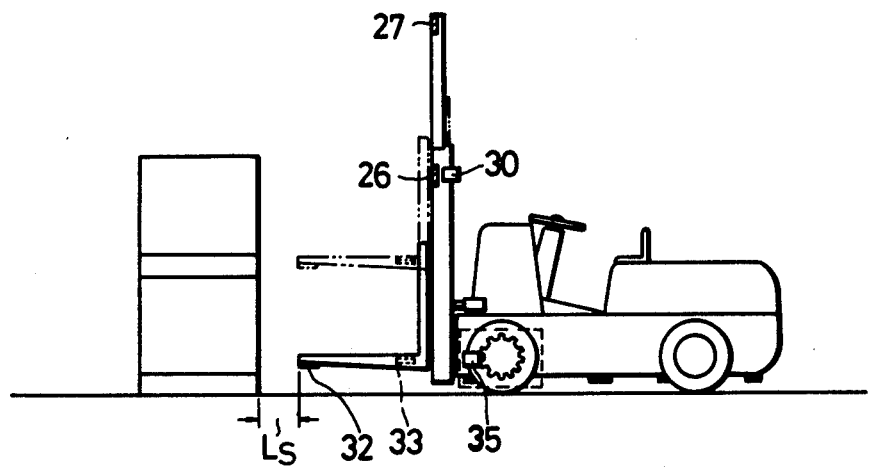
FIGS. 6(a) and 6(b) are side views for explaining the load delivery operation according to the control operation shown in FIG. 3.
Figure 6B:
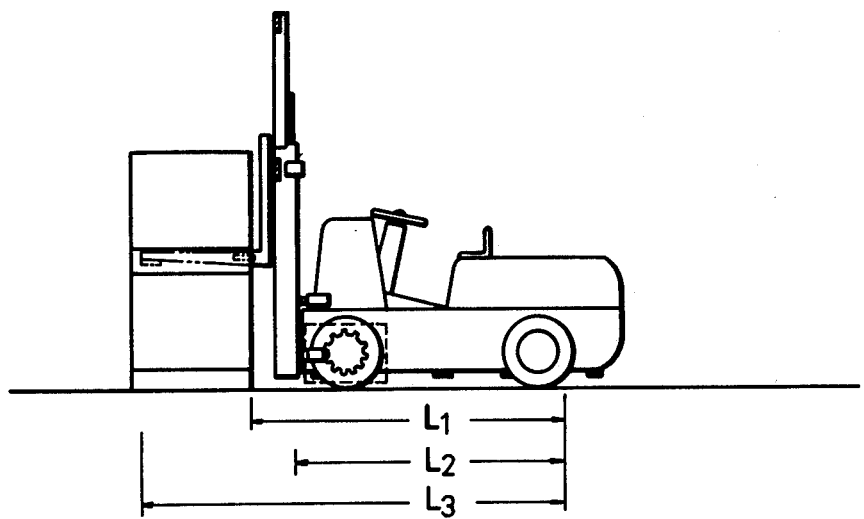

Upon detection of existence of the first layer load by means of the sensor 32, the fork lift truck 2 running in the lane stops at a point at which the distance between the foremost end of the claw of the fork 31 and the load is $L_1-L_2=LS$ (See FIG. 6(a)). After determination of the layer from which the load should be delivered out on the basis of the outputs of the sensors 37, 26 and 27, the actuator 46 is controlled by a signal from the delivery layer selection gate circuit $G_2$ of the fork height control device 45 in the same manner as has been described above so that the fork 31 is lifted to a height at which the claw 31a of the fork 31 can enter the pallet of the layer from which the load should be delivered out (FIG. 6(a)) shows second layer delivery). Then, a forward movement instruction is provided on the line 47 to move the fork lift truck forwardly in the same manner as described above and the fork lift truck 2 stops at a position at which the claw 31 has sufficiently entered the pallet of the layer (FIG. 6(b)).

At this time, the AND gate 52 is enabled and thereupon an AND gate 59 to which the delivery instruction OD from the terminal $T_B$ and a signal obtained by inverting the output of the fork load sensor 33 are applied through an AND gate 58 is enabled to provide a fork lifting instruction to an analog switch $AS_2$ to close it. Accordingly, a lifting amount set instruction VSU is applied from a lifting amount setter UVS to the servo amplifier SA to actuate actuator 46 for lifting the fork 31 by a distance corresponding to the signal VSU. When the output of the fork load sensor 33 is turned to "1" by lifting of the fork 31, the AND gates 58 and 59 are disenabled so that lifting of the fork 31 is stopped. Simultaneously, an AND gate 60 to which the delivery instruction from the terminal $T_B$ and the output of the fork load sensor 33 are applied is enabled to apply a signal "1" to the running control device through the OR gate 57 as a reverse movement instruction. Thus, the fork lift truck 2 moves reversely and the load delivery work is completed.

After the sequence control of the load storage or delivery operation, the fork lift truck 2 runs in a reverse direction along the lane leader cable in response to the signal of the frequency $f_2$ and, upon detection of the signal of the frequency $f_1$ supplied from the main leader cable 3 at the branch point, runs forwardly along the main leader cable 3, guided by the signal of the frequency $f_1$ of the main leader cable 3, until it reaches the Table 1.

Loading and unloading operations at the Table 1 can be similarly realized by utilizing the control operations described hereinabove with respect to the loading and unloading in the respective layers.

In the above described embodiment, the storage and delivery Table 1 constitutes a sole predetermined base position of conveying the load and a single main leader cable 3 is used. It should be noted, however, that a plurality of predetermined base positions may be provided and a plurality of main leader cables may be used.

The foregoing is an example in which lifting and lowering of the fork is conducted at a constant speed.

FIGS. 7 through 10 show an embodiment in which fork lifting and lowering speeds are variably controlled in loading and unloading operations for increasing work efficiency. According to this embodiment, the speed of the lift cylinder is varied depending upon difference between a present height of the fork and a target height thereof whereby a cycle time of the work can be shortened without sacrificing accuracy of the work.

Figure 7:
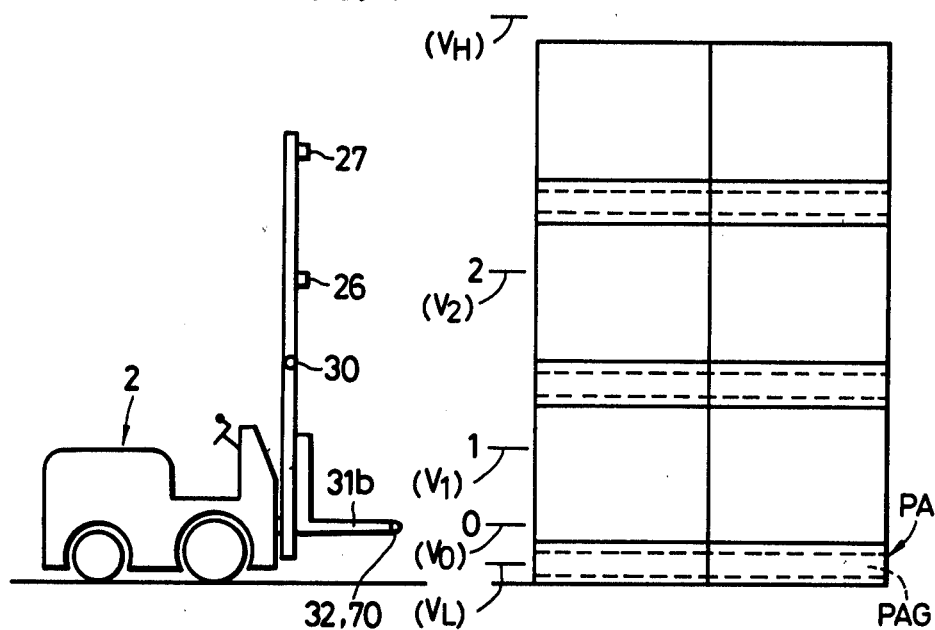
FIG. 7 is a view showing positions of sensors mounted on the vehicle and reference voltage levels set in accordance with heights of the load.

In FIG. 7, an opening detection sensor 70 for detecting a fork insertion opening PAG of a pallet PA is provided in parallel with the sensor 32 at the foremost end portion of the fork 2 of the fork lift truck 1.

Figure 8:
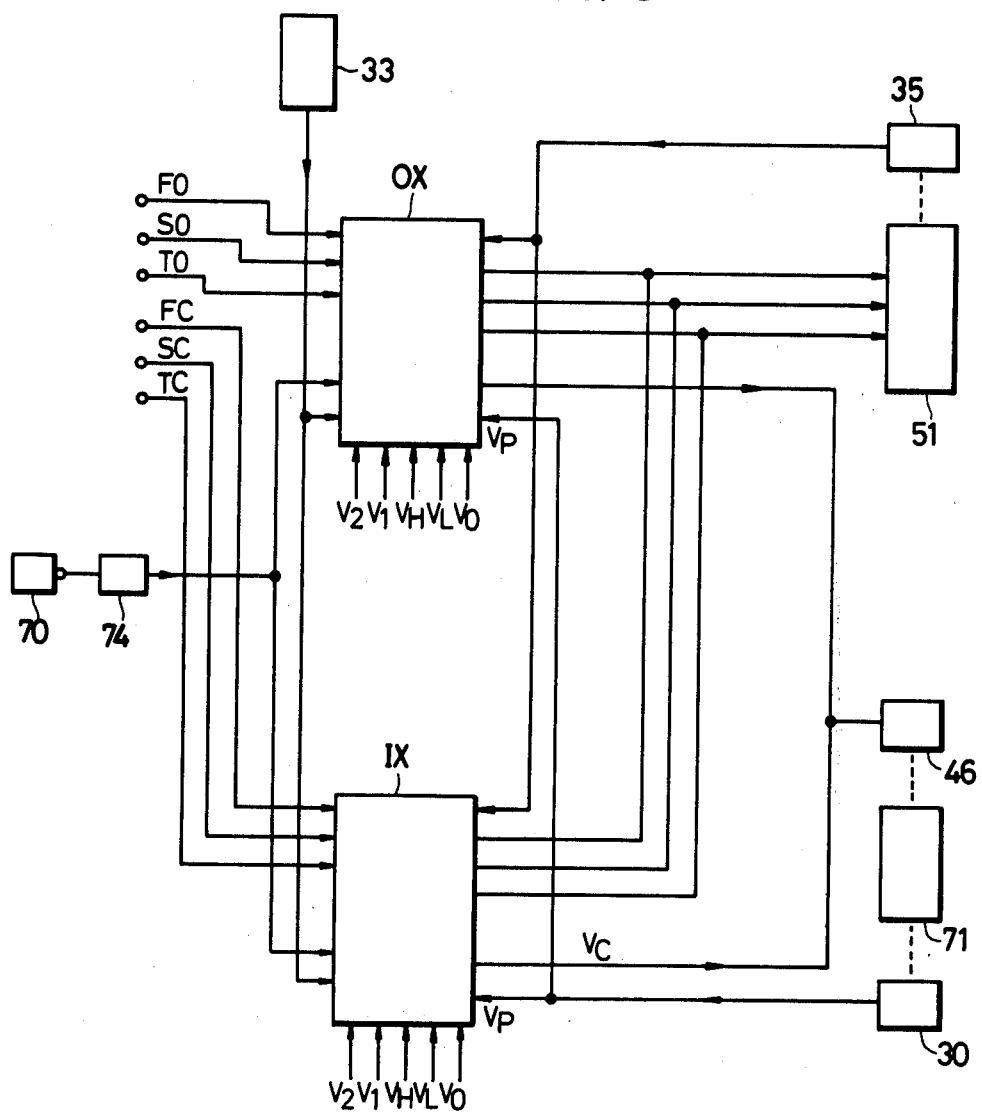
FIG. 8 is a block diagram showing speed control for fork lifting and lowering and control for forward and reverse movements of the vehicle.

FIG. 8 is a block diagram showing control for lifting and lowering of the fork and forward and reverse movements of the fork lift truck.

The output of a pallet opening sensor 70 is applied to a pallet opening detection circuit 74 for level detection and thereafter is applied to a delivery control circuit OX and a storage control circuit IX. To the delivery control circuit OX are applied a first layer delivery signal FO, a second layer delivery signal SO and a third layer delivery signal TO and also the output of the fork load sensor 33. To the storage control circuit IX are applied a first layer storage signal FI, a second layer storage SI and a third layer storage signal TI and also the output of the fork load sensor 33. Reference voltage $V_L$, $V_0$, $V_1$, $B_2$ and $V_H$ corresponding respectively to the lower limit, level 0, level 1, level 2 and upper limit levels shown in FIG. 7 are applied to the delivery control circuit OX and the storage control circuit IX. These reference voltages may be provided by a suitable device such as a potentiometer.

The control operation for delivery of a load from the storage place will now be described with reference to FIG. 9 which shows the delivery control circuit OX in detail and FIG. 11 which shows modes of control.

In the case of delivering (unloading) a load of the third layer, the fork lift truck which has advanced with the height of the fork being maintained at the level 0 stops in front of the stacked load. Upon generation of the third layer delivery signal TO, this signal TO is supplied to a flip-flop $FF_1$ through an OR gate $OR_1$ to set the flip-flop $FF_1$. A height speed lifting signal HE generated by a high speed lifting setter HSE is thereby supplied to the actuator 46 through an amplifier to cause the fork to be lifted at a high speed. Before the fork reaches the level 2, the pallet opening sensor 70 detects a pallet opening between the first and second layers. The high speed lifting operation, however, is not affected by this detection, i.e., the detection is masked. When the fork has reached the level 2, the output $V_p$ of the height detector 30 becomes equal to the reference voltage $V_2$ whereupon a detector $COM_2$ produces a detection output. This output causes a flip-flop $FF_2$ to be set thereby causing a middle speed lifting signal ME generated by a middle speed lifting setter MSE to be applied to the actuator 46. Accordingly, the fork is lifted at a middle speed. During the lifting of the fork at a middle speed, a signal detecting a substantially central position of the pallet opening PAG is applied through an AND gate $AN_1$ to the flip-flop $FF_2$ for resetting it after being delayed by a predetermined period of time by an off delay circuit ODL. As the flip-flop $FF_2$ is reset, the middle pseed lifting signal ME is interrupted. The signal from the off delay circuit ODL is simultaneously supplied to a flip-flop $FF_3$ to set it, so that a low speed lowering signal LE generated by a low speed lowering setter LSE is supplied to the actuator 46 to lower the fork at a low speed. When the sensor 70 has produced an output again during the low speed lowering of the fork, the flip-flop $FF_3$ is reset to interrupt the low speed lowering signal LE, thereby stopping the actuator 46. The output of the sensor 70 is also applied to a flip-flop $FF_7$ to set it and thereby cause a forward movement signal to be applied to a running control unit 51. The fork lift truck thereby moves forwardly. During the forward movement of the fork lift truck, a pulse corresponding to the distance travelled by the fork lift truck and detected by the running distance detector 35 is applied through an AND gate $AN_2$ to a counter $C_1$. The output of a counter $C_1$ is applied to a comparator $COM_7$ as one of its inputs. The comparator $COM_7$ compares this output of the counter $C_1$ with a voltage FS from a forward movement distance setter FLS and produces an output when the distance actually travelled by the fork lift truck coincides with the set distance. The output of the comparator $COM_7$ is applied to a flip-flop $FF_9$ through an OR gate $OR_2$ to set the flip-flop $FF_9$. The set output of the flip-flop $FF_9$ is applied to the running control unit 51 so that the fork lift truck stops its forward movement.

The output of the comparator $COM_7$ is also applied to a flip-flop $FF_5$ to set it. Upon setting of the flip-flop FF$_5$, a low speed lifting signal LUE from a low speed lifting setter LSUE is applied to the actuator 46 for effecting low speed lifting of the fork. When the load is placed on the fork, the fork load sensor 33 is actuated and emits a signal 1. This signal 1 is delayed by a predetermined period of time by a delay circuit DL and thereafter is applied to a reset terminal of the flip-flop FF$_5$ for resetting it. This delay time is provided for ensuring that the load be completely placed on the fork. When the flip-flop FF$_5$ has been reset, the low speed lifting signal LUE is interrupted so that the low speed lifting of the fork is stopped. Simultaneously with resetting of the flip-flop FF$_5$, flip-flops FF$_7$ and FF$_8$ are set so that the fork lift truck moves reversely and a pulse corresponding to the distance travelled by the fork lift truck is applied to a counter C$_2$ through an AND gate AN$_3$. The output of the counter C$_2$ is compared with a voltage RS from a reverse movement distance setter RLS by a comparator COM$_6$ which, upon detection of coincidence between the output of the counter C$_2$ and the voltage RS, produces an output which is applied to a flip-flop FF$_9$ through an OR gate OR$_2$ to set the flip-flop FF$_9$. Consequently, the fork lift truck stops its reverse movement. Since the output of the comparator COM$_6$ switches a contact SW$_7$ to an opposite side of the position shown in the figure, the output of the comparator COM$_5$ is applied to the actuator 46. The comparator COM$_5$ outputs a difference value between the reference voltage V$_0$ and the output V$_p$ of the height detector 30, so that the fork is quickly lifted to the level 0 at a speed corresponding to the difference V$_p$−V$_0$.

In the case where a load in the second layer is delivered out, delivery of the load is similarly performed by a sequence of operations, i.e., high speed lifting, middle speed lifting, low speed lowering, forward movement, low speed lifting, forward movement, lowering at a speed corresponding to the difference V$_p$−V$_0$. It should be noted, however, that the high speed lifting of the fork is only up to the level 1.

In the case where a load in the first layer is to be delivered out, the fork is lowered at a low speed from the level 0 to the height of a pallet for the load of the first layer. After insertion of the fork by the forward movement of the fork lift truck, the fork is lifted to the level 0 at a speed corresponding to the difference V$_p$−V$_0$ whereby delivery of the load is performed.

Figure 9:
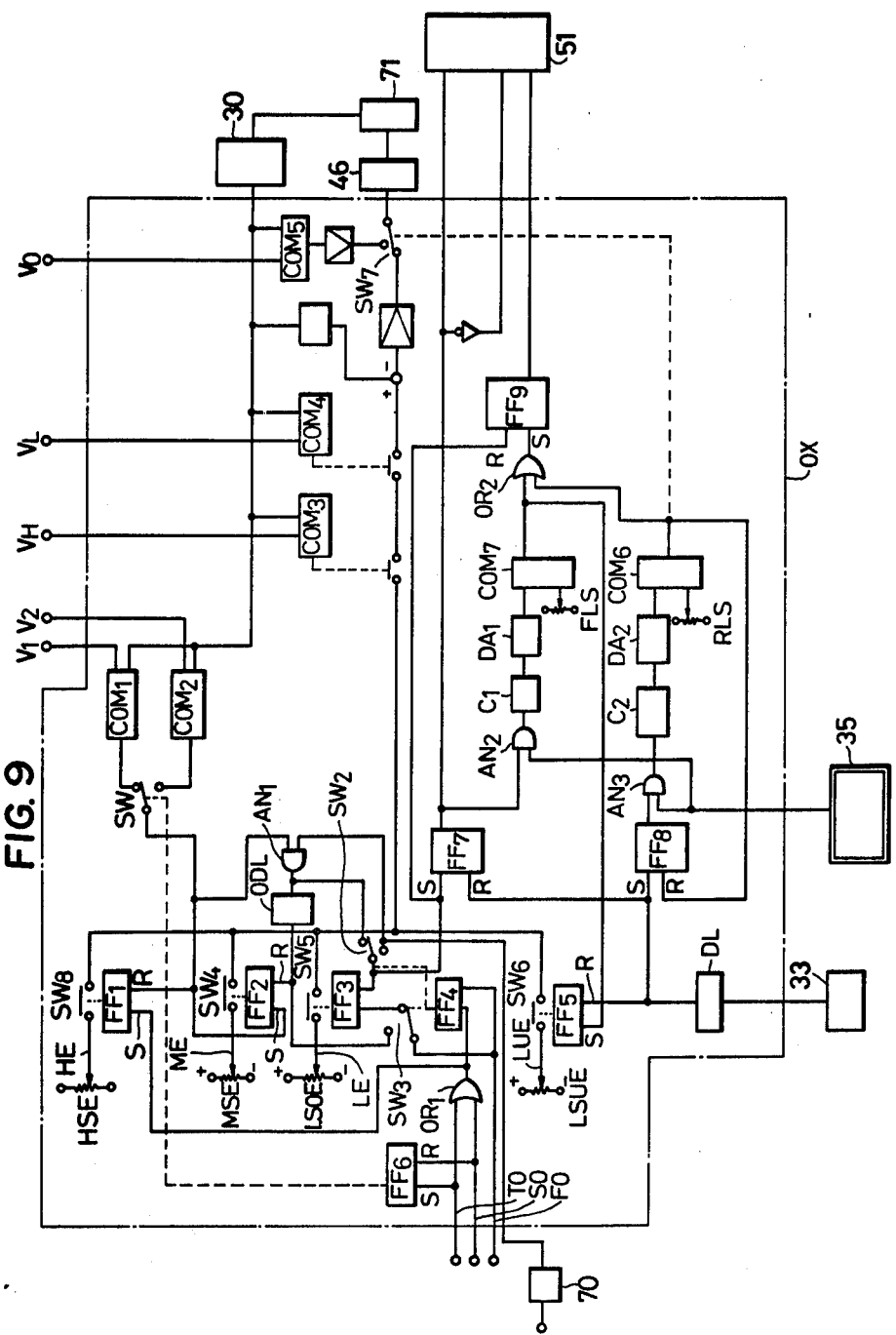
FIG. 9 is a block diagram showing a delivery control circuit OX in detail.

In FIG. 9, comparators COM$_3$ and COM$_4$ function to stop lifting or lowering of the fork at upper and lower limit positions thereof. Switches SW$_1$, SW$_2$, SW$_3$, SW$_4$, SW$_5$ and SW$_6$ are provided for switching their corresponding flip-flops FF$_6$, FF$_4$, FF$_2$, FF$_3$ and FF$_5$ to an opposite side of the positions shown in FIG. 9 when these flip-flops are set.

Figure 10:
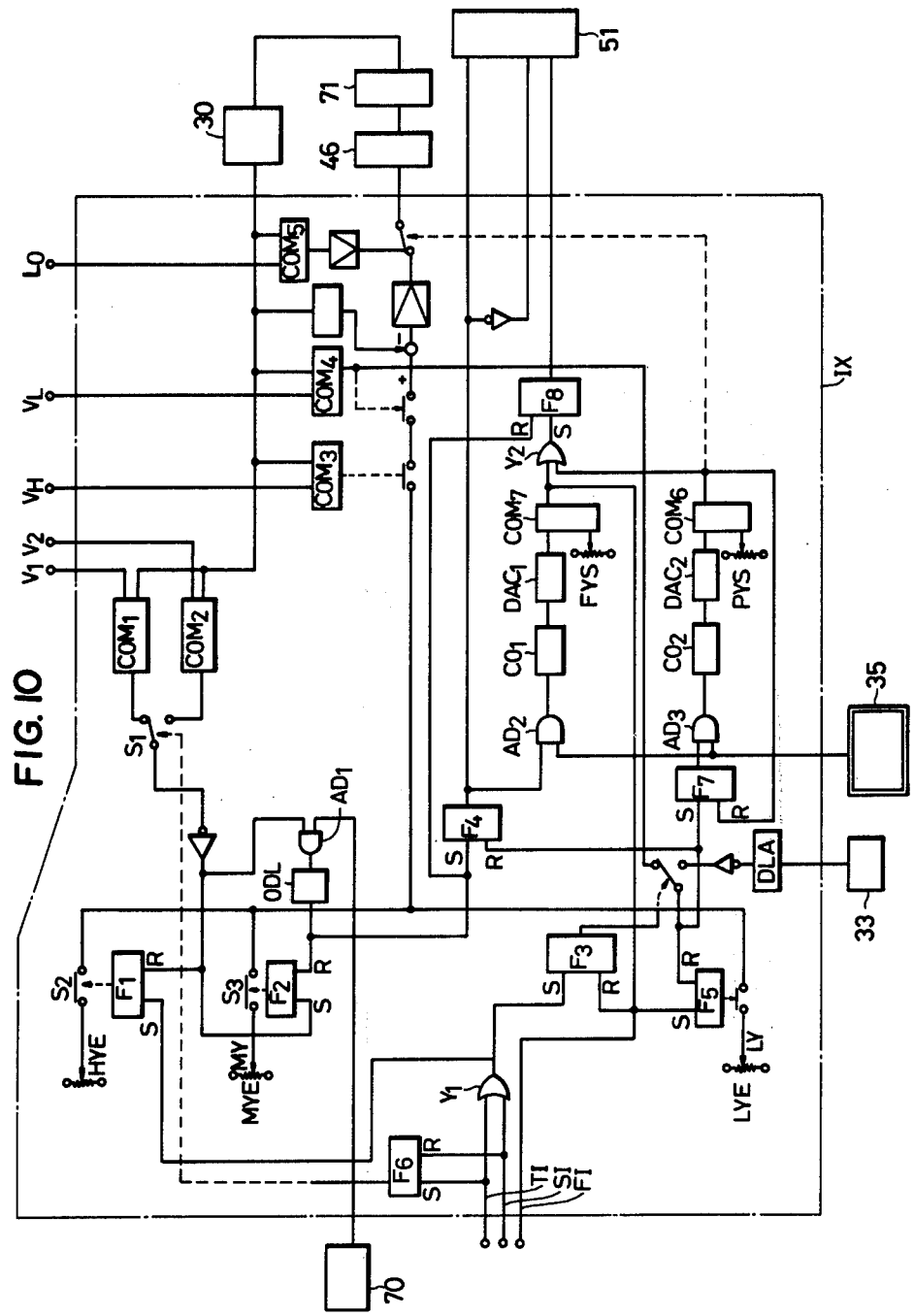
FIG. 10 is a block diagram showing a storage control circuit IX in detail.

The operation for storing the load will now be described with reference to FIG. 10 which shows the storage control circuit IX in detail and FIG. 12 which shows modes of control.

Assume now that the load is stacked in two layers and a new load is to be stored as the third layer. In this case, a third layer storage signal TI is produced. This signal TI is supplied to a flip-flop F$_1$ through an OR gate Y$_1$ to set the flip-flop F$_1$. Setting of the flip-flop F$_1$ causes a high speed lifting signal HY from a high speed lifting setter HYE to be applied to the actuator 46 through an amplifier whereby the fork is lifted at a high speed. When the fork has reached the level 2, the output V$_p$ of the height detector 30 becomes equal to a reference voltage V$_2$ and a comparator CO$_2$ produces a coincidence detection output. This output is applied to a flip-flop F$_2$ to set it thereby enabling a middle speed lifting signal MY from a middle MYE to be applied to the actuator 46. Accordingly, the fork is lifted at a middle speed. During the lifting of the fork at a middle speed, the sensor 70 detects a pallet opening but this does not affect the control operation, the senor 70 produces a signal when the fork has exceeded the upper limit of the load in the second layer. This signal of the sensor 70 is applied to the off delay circuit ODL through an AND gate AD$_1$ and delayed by the off delay circuit ODL by a predetermined period of time. The flip-flop F$_2$ is reset by this signal from the off delay circuit ODL and the middle speed lifting signal MY is thereby interrupted. Accordingly, the lifting of the fork at a middle speed is stopped. The signal from the off delay circuit ODL is also applied to a flip-flop F$_4$ to set it so that the fork lift truck moves forwardly. Control of the distance of the forward running is made in a manner similar to the control described above with reference to FIG. 9. More specifically, a pulse from a running distance detector 35 is counted by a counter CU$_1$. The output of the counter CU$_1$ is converted into an analog value by a digital-to-analog converter DAC$_1$ and thereafter is compared with a set voltage FY from a distance setter FYS in a comparator CO$_7$. When the fork lift truck has moved forwardly by a set distance, a flip-flop F$_5$ is set by the output of the comparator CO$_7$ to cause a low speed lowering signal LY to be applied to the actuator 46. Thus, lifting of the fork at a low speed is effected.

When the load is unloaded from the fork, the output of the fork load sensor 33 becomes zero, and this zero output is delayed by a delay circuit DLA by a predetermined period of time and thereafter is inverted by an inverter and applied to a flip-flop F$_5$ to reset it. This delay is provided for ensuring laying of the new load on the top layer. Resetting of the flip-flop F$_5$ interrupts the low speed lowering signal LY. Simultaneously with resetting of the flip-flop F$_5$, the flip-flop F$_4$ is reset so that the fork lift truck moves reversely. Control of the reverse movement is preformed in a manner similar to the above described control of the forward movement by a circuit including a counter CU$_2$, an analog-to-digital converter DAC$_2$, a comparator CO$_6$ and a distance setter RYS upon setting of a flip-flop F$_7$. When the fork lift truck has stopped the reverse movement, the output of the comparator CO$_5$ is applied to the actuator 46 due to the output of the comparator CO$_6$ whereby the fork is lowered to the level 0 at a speed corresponding to the difference V$_p$−V$_0$.

Laying of the load of the second layer is similarly effected by a sequence of operations including high speed lifting, middle speed lifting, forward movement, low speed lowering, reverse movement and lowering at a speed corresponding to the difference V$_p$−V$_0$. The high speed lifting in this case is made only up to the level 1. In a case where the load is laid down as the first (bottom) layer, the fork is lowered from the level 0 to the level of the lower limit voltage V$_L$ and, after reverse movement of the fork lift truck, the fork is lifted at a speed corresponding to the difference V$_p$−V$_0$.

In the above described manner, the layer number (i.e. first, second, etc.) for delivery or storage of a load is detected on the basis of detection outputs of respective sensors and the fork is lifted at a high speed or a middle speed to a level near the detected layer and then a final positioning of the fork is made at a low speed. By this arrangement, the cycle time of the work is greatly shortened without sacrificing accuracy of the loading and unloading operations.

Figure 13:
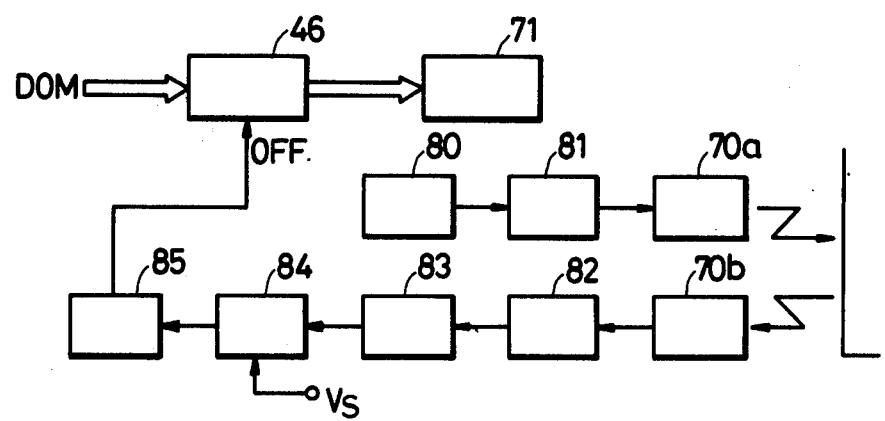
FIGS. 13 through 15 are block diagrams showing examples of control for stopping the fork lifting or lowering operation at a fork insertion position by detecting a pallet opening by means of a sensor 70.
Figure 14:
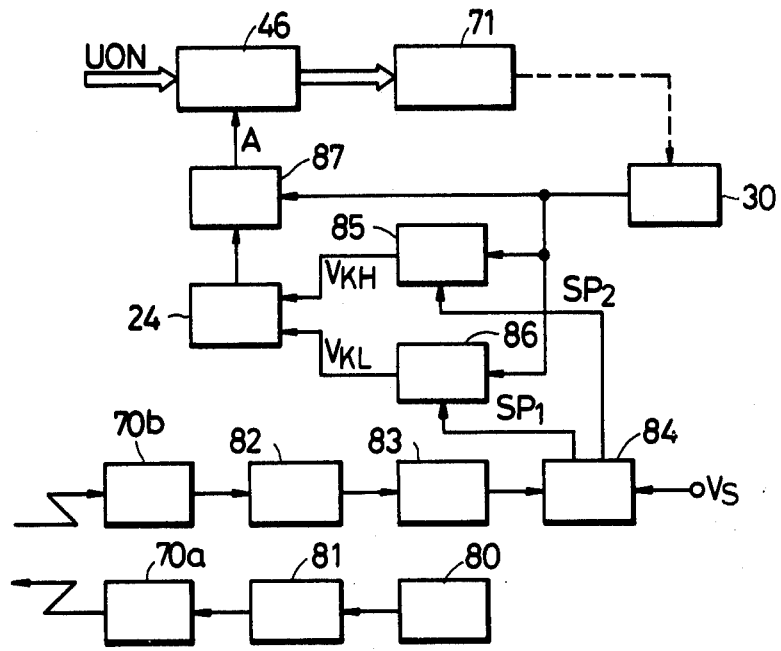
Figure 15:
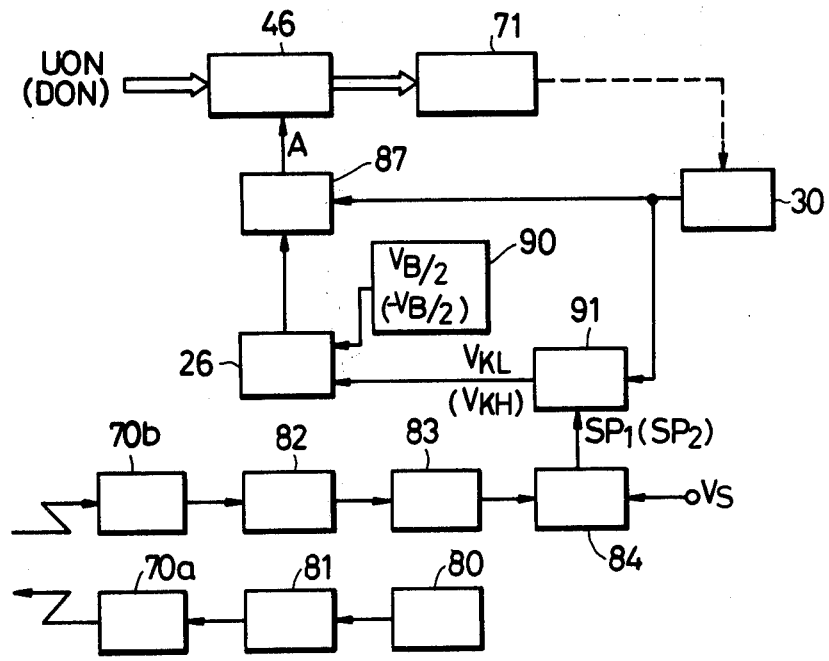

FIGS. 13–15 show one example of control for detecting the pallet opening by the opening detection sensor 70 and stopping lifting and lowering of the fork at the fork insertion position.

In FIG. 13, the output of an oscillator circuit 80 is modulated by a modulation circuit 81 and, in response to the output of this modulation circuit 81, a modulated light is projected from a light emitting element 70a provided in the front of the fork toward a load CA or a pallet PA. The reflected light is received by a light receiving element 70b. The output of the element 70b is amplified by an amplifier 82 and rectified in its waveform by a filter 83 and thereafter is compared with a reference level $V_s$ in a comparison circuit 84.

As the fork 31b is lowered by supplying a fork lowering control signal DON to the actuator 46, the light is initially reflected by the load CA. When the emitted light has fallen below the upper plate portion of the pallet PA, the light is not reflected any longer so that the pallet opening detection output is produced by the comparison circuit 84. This pallet opening detection output is delayed by a delay circuit 85 by a suitable duration of time and thereafter is applied to the actuator 46 as an actuator OFF signal OFF. This delay circuit has a delay time of $$T = D/2v$$

Where v represents the fork lowering speed and D width of the pallet opening PAG. Accordingly, when the fork 31b has reached the center of the pallet opening PAG, the actuator 46 becomes OFF and the fork 31b stops at the fork insertion position.

In the example shown in FIG. 14, the output of an oscillation circuit 80 is modulated by a modulation circuit 81 and a modulated light is projected from a light emitting element 70a. The reflected light is detected by a light receiving element 70b and supplied to a comparison circuit 84 through an amplifier 82 and a filter 83 in the same manner as in the example shown in FIG. 13. As the fork 31b is lifted by supplying a fork lifting control signal UON to the actuator 46, the fork position is converted to an electrical signal by the fork height sensor 30 and supplied to the sample hold circuits 85 and 86 and also to a comparison circuit 87.

When the lifting fork 31b has reached the lower edge of the pallet opening PAG, the reflected light disappears thereby causing the comparison circuit 84 to produce an opening detection output. At this time, a sample pulse $SP_1$ is produced to cause the sample hold circuit 86 to hold an output voltage $V_{KL}$ of the sensor 30 at that instant. When the lifted fork 31b has reached the upper edge of the pallet opening PAG, the reflected light is received by the light receiving element 70b again and detected by a comparison circuit 84. A sample pulse $SP_2$ thereupon is produced to cause a sample hold circuit 85 to hold an output voltage $V_{KH}$ of the sensor 30 at that instant. The voltages $V_{KL}$ and $V_{KH}$ held by the sample hold circuits 86 and 85 represent heights of the lower and upper edges of the pallet opening PAG. These voltages held by the circuits 86 and 85 are supplied to a mean value circuit 88 which produces a mean value $(V_{KL} + V_{KH})/2$ of these voltages. This mean value which represents the height of the center of the pallet opening PAG is applied to a comparison circuit 87 as a target value. The comparison circuit 87 compares the output of the sensor 30 with the target value and provides the actuator 46 with a control signal A so as to reduce the difference to 0. The fork 31b is brought into the fork insertion position by the above described control operation.

FIG. 15 is a modification of the example shown in FIG. 14. In this modified example, a single sample hold circuit 91 is used and, instead of the other sample hold circuit, a circuit 90 outputting a voltage equivalent to half of a voltage $V_{KB}$ corresponding to the width of the pallet opening PAG is provided. In case the fork lifting control signal UON is applied to the actuator 46, the voltage $V_{KL}$ is held by using the pulse $SP_1$ sampling the lower edge of the pallet opening PAG and a voltage $(-V_{KB}/2)$ is added to the voltage $V_{KL}$. In case the fork lowering control signal DON is applied to the actuator 46, the voltage $V_{KH}$ is held by using the pulse $SP_2$ sampling the upper edge of the pallet opening PAG and the voltage $(-V_{KB}/2)$ is added the voltage $V_{kH}$. The mean value circuit 88 in FIG. 14 is substituted by an adder circuit 89 in this example. The output of the adder circuit 89 is compared with the voltage of the sensor 30 to operate the actuator 46 in accordance with a result of comparison so that the fork 31b is positioned at the center of the pallet opening PAG.

As described in the foregoing, the control system according to the invention comprises a light emitting element and a light receiving element mounted on the fork for automatically detecting the pallet opening and thereby determining the fork insertion position. Accordingly, positioning of the fork can be accurately made irrespective of change in the height or shape of the load or deformation of the load due to its weight.

In the above described embodiment, a combination of the light emitting element and the light receiving element is employed as the sensor 71. The sensor 71, however, may by constituted by other devices such, for example, as a supersonic wave switch or a proximity switch.

Figure 16:
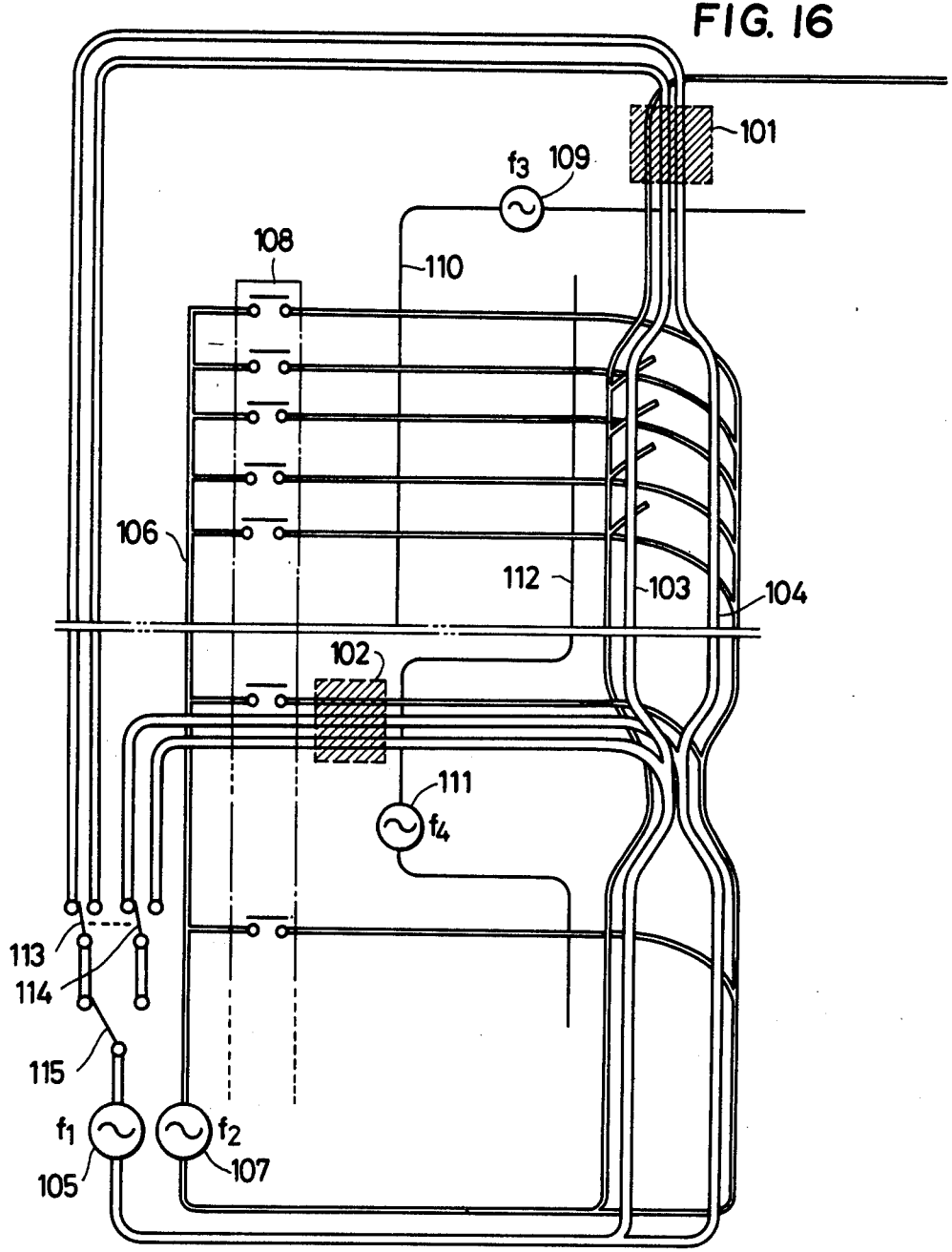
FIG. 16 is a diagram showing an example of layout of leader cables.

FIG. 16 shows an example of provision of the leader cables in a case where two base positions, i.e., a storage station 101 and a delivery station 102, are provided. In this example, main leader cables 103 and 104 are energized by an oscillator 105 generating current of a frequency $f_1$. Lane leader cables 106 are energized by an oscillator generating current of a frequency $f_2$. Switching of the lanes is conducted by a lane switching circuit 108. A leader cable 110 which is energized by an oscillator generating current of a frequency $f_3$ indicates a finishing end of each lane whereas a leader cable 112 which is energized by an oscillator 111 generating current of a frequency $f_4$ indicates a starting end of each lane.

Left-right switches 113 and 114 are interlocked with each other. By selecting either of the main leader cables 103 and 104, a guide way consisting of the main leader cable and the lane leader cables provided on the left side of central portion of the main leader cables 103 and 104 or the lane leader cable (not shown) provided on the right side of the main leader cables is formed.

A storage-delivery switch 115 is provided for forming a guide way for storage or delivery of the load. When the switch 115 is switched to the storage side as shown in the figure, a storage guide way to the storage station 101 is formed, whereas when the switch 115 is switched to the delivery side, a delivery guide way to the delivery station 102 is formed.

Figure 17:
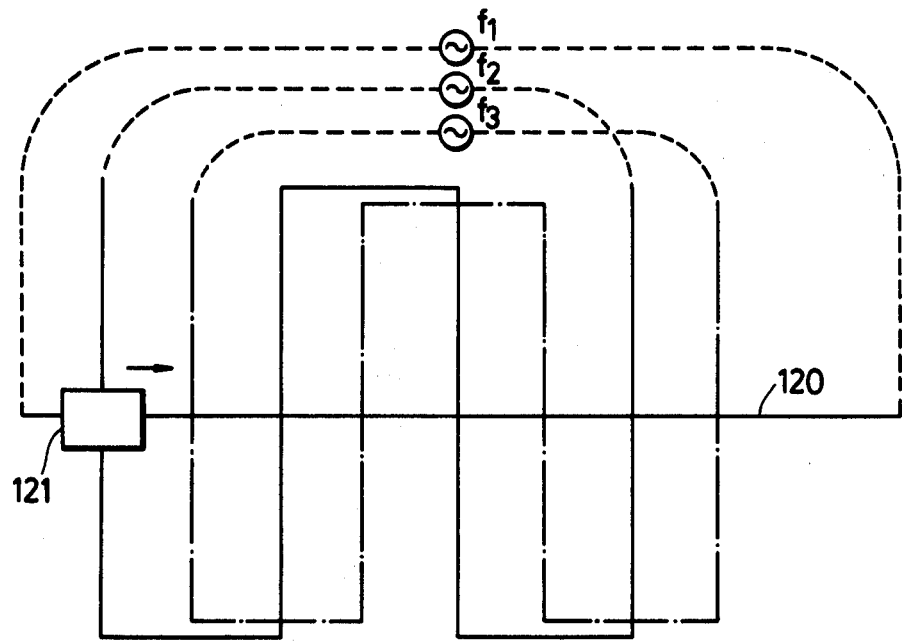
FIG. 17 is a diagram showing another example of layout of leader cables.

The lane leader cables may be provided in such a manner that they repeatedly intersect at right angles with a central path 120 as shown in FIG. 17 and each of the lane leader cables is energized by frequencies which differ from each other. In this case, an unmanned travelling vahicle 121 runs along the central path 120 and detects its present position and a lane designated by the central control unit (not shown) by detecting the frequency of the lane leader cable intersecting the central path 120 and the number of intersections between the central path 120 and the lane leader cables counted from the starting point. Upon reaching the intersection with the designated lane, the frequency which the vehicle should follow is changed from the frequency $f_1$ to the frequency $f_2$ or $f_3$ whereby the vehicle is guided along the designated lane. If an error in counting of the intersections should occur, this state can be detected by loss in correspondency with the frequency so that the position of the vehicle can be corrected or the vehicle can be stopped for prevention of an erroneous operation of the vehicle.

According to this example shown in FIG. 17, the vehicle can detect its present position and, accordingly, the central control unit can watch the position of the vehicle by receiving a gignal emitted from the vehicle. This arrangement is convenient in a case where a plurality of vehicles are used for storing or delivering out the load since side-tracking of the vehicles for preventing collision can be made in accordance with instructions from the central control unit.

Figure 18:
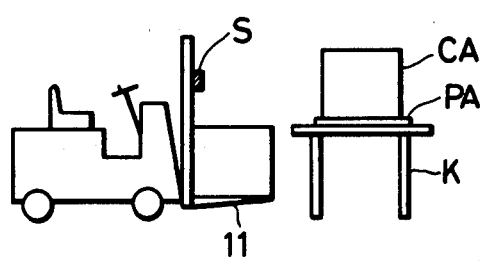
FIG. 18 is a side view of an example of a table used as a storage and delivery table 1.

A table K as shown in FIG. 18 is usually used as the storage and delivery table 1 shown in FIG. 1, the storage table 101 or the delivery table 102 respectively shown in FIG. 16. The load CA is put on the table K in a single layer. In this case also, unloading of the load from the table K and loading of the load on the table K are conducted in the same manner as has previously been described. In this example, a sensor S is mounted on the mast of fork lift truck for detecting presence or absence of the load. The above described sensors 26 and 27 may, however, be used to perform the function of the sensor S. In this example, if there is no load on the table K when the load is to be stored, this state is judged to be abnormal and the operation of the fork lift truck is stopped. Likewise, if there is a load on the table when other load is to be delivered out of storage, this state is judged to be abnormal and the operation of the fork lift truck is stopped.

In the above described embodiments, description has been made about controls of the conveying system in a work area between a gateway (a predetermined base position) and a storage place in a warehouse. The work area to which the present invention is applicable is not limited to a warehouse but the invention is applicable to any kind of work area including e.g., a factory and a railway station.

What is claimed is:

1. An unmanned conveying control system comprising:
   main leader cables energized by a guide signal of a first frequency;
   lane leader cables energized by a guide signal of a second frequency;
   an unmanned travelling vehicle running along said leader cables for conveying a load, said vehicle being guided by the guide signals flowing through said leader cables;
   means for superimposing upon said first and second frequencies a third frequency corresponding to the storing of a load and a fourth frequency corresponding to the delivering out of a load;
   a memory for storing data including the position of a load placed on a lane in a work area and the number of layers of the load;
   means for rewriting the contents of said memory each time an operation of storing or delivering out of the load is completed;
   leader cable selection means for selecting suitable ones from among said leader cables for forming a load conveying way between a predetermined base position and a desired position in the work area;
   a central control unit for controlling said leader cable selection means and giving load conveying instructions to said vehicle in accordance with the contents of said memory; and
   loading and unloading control means mounted on said vehicle for detecting the presence or absence of a load in front of said vehicle and the number of layers of the load and for loading and unloading the load in response to said load conveying instructions.

2. An unmanned conveying control system as defined in claim 1 wherein said loading and unloading control means comprise:
   distance sensors for detecting the distance between a load and the front of said vehicle;
   a discriminating circuit for discriminating a layer of the load to be stored or delivered out in response to the output of said distance sensors;
   a fork load sensor for detecting whether the load is placed on a fork of said vehicle or not;
   a vehicle stopping control circuit for stopping the vehicle at predetermined positions in front of the load, i.e., at a loading and unloading position and at a position which is spaced from said loading and unloading position by a predetermined distance, in response to the output of said distance sensor; and
   loading and unloading control means for sequence controlling forward and reverse movements of the vehicle and lifting and lowering of the fork after the vehicle has stopped at the loading and unloading position in response to the outputs of said discriminating circuit and said fork load sensor.

3. An unmanned conveying control system as defined in claim 2 wherein said discriminating circuit comprises:
   a circuit for producing a signal representing a fully loaded state if the load is stored in all of the layers when a new load is to be stored;
   a circuit for producing a signal representing an empty state if there is no load when the load is to be delivered out; and
   a circuit for producing a signal representing a layer in which the load is to be stored or from which the load is to be delivered out if the layers are neither fully loaded nor empty.

4. An unmanned conveying control system as defined in claim 2 wherein said vehicle stopping control circuit comprises:
   a first comparison circuit for comparing the output of said distance sensor with a reference voltage and, when they coincide with each other, producing an output;
   a pulse generator for producing pulses in accordance with revolutions of wheels of the vehicle;

a counter for counting the pulses produced by the pulse generator in response to the output of said first comparison circuit; and at least one second comparison circuit for comparing the count of said counter with a preset value and, when they coincide with each other, producing a vehicle stop signal;

a distance travelled by the vehicle after production of the output of said first comparison circuit being measured to stop the vehicle in accordance with a desired distance.

5. An unmanned conveying control system as defined in claim 2 wherein said loading and unloading control means comprises: means for lifting the fork at a constant speed up to a height corresponding to a height signal produced by said discriminating circuit at the loading and unloading position;

means for moving the vehicle forwardly by a predetermined distance after said lifting of the fork and then lifting or lowering the fork at a constant speed by a predetermined distance;

means for controlling a reverse movement of the vehicle after loading or unloading in response to the output of said fork load sensor; and means for controlling lifting or lowering of the fork in response to the fork lifting or lowering signal.

6. An unmanned conveying control system as defined in claim 2 wherein said loading and unloading control means comprises:

means for presetting reference heights in the vicinity of heights corresponding to pallet heights of the respective layers of load;

means for operating a lift cylinder for lifting or lowering the fork at a high speed toward one of the reference heights in the vicinity of a desired layer of load;

a sensor provided at the foremost end portion of the fork for detecting the pallet heights; and means for operating the lift cylinder at a middle speed from the reference height toward the pallet height of the desired layer of load so as to bring the fork height to the pallet height of the desired layer of load upon detection of the pallet height.

* * * * *